March 23, 1971  C. R. HARDEN  3,572,199
PIPE FABRICATOR
Filed May 28, 1969  3 Sheets-Sheet 1
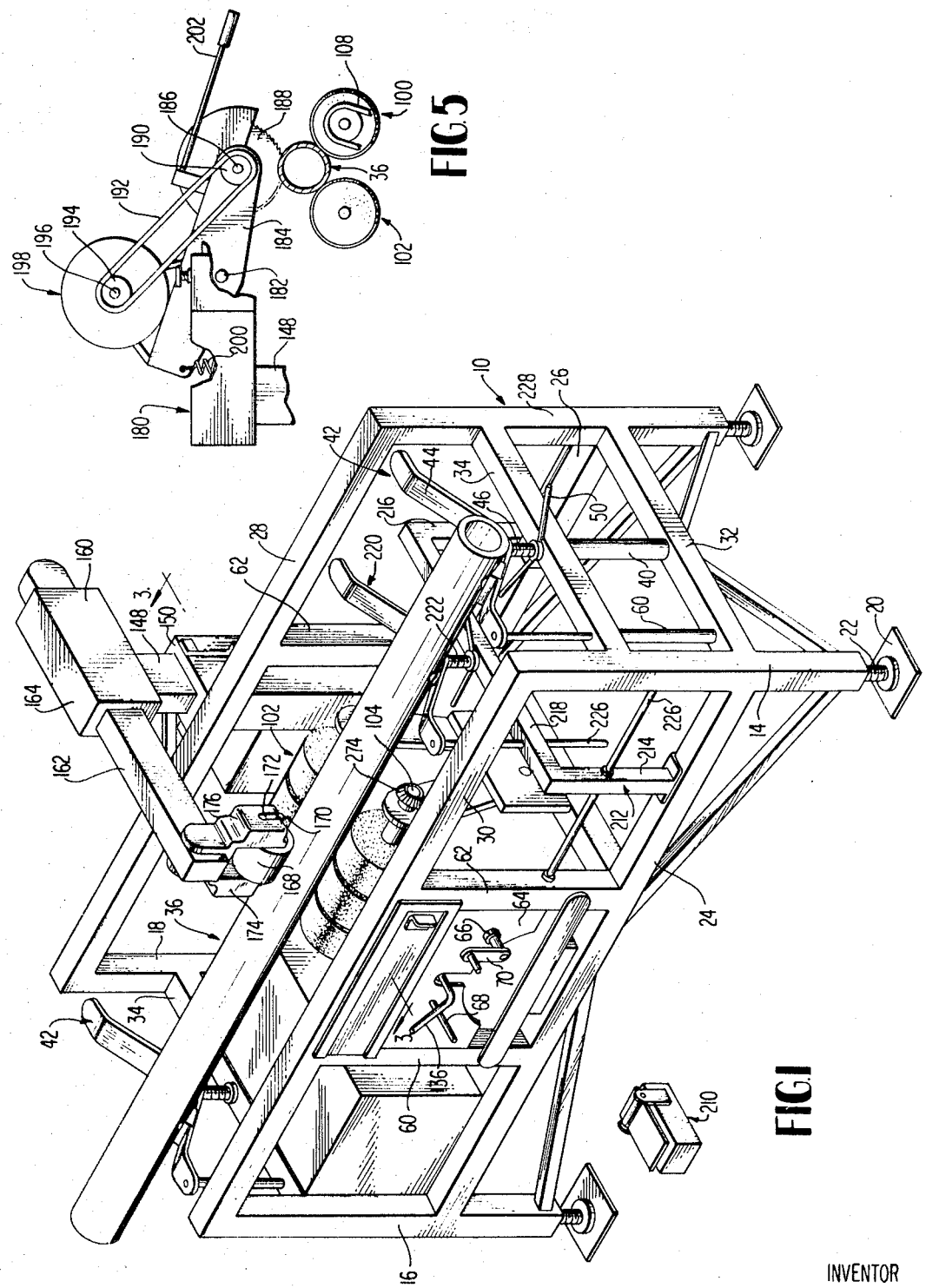
INVENTOR
CHARLES R. HARDEN
BY Newton, Hopkins, & Ormsby
ATTORNEYS March 23, 1971  C. R. HARDEN  3,572,199
PIPE FABRICATOR
Filed May 28, 1969  3 Sheets-Sheet 2
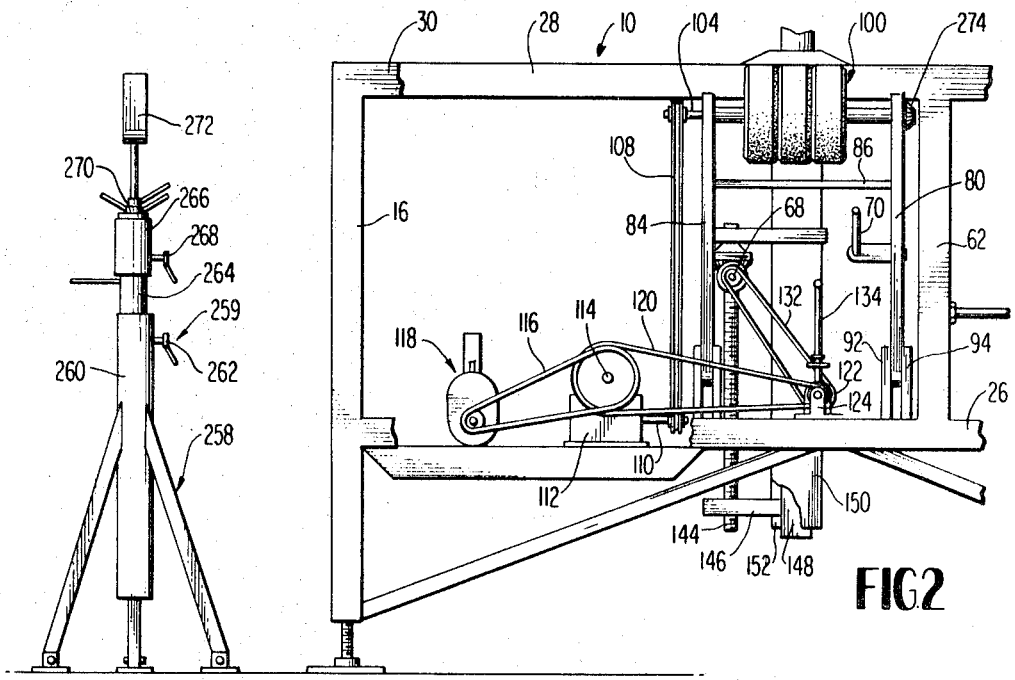
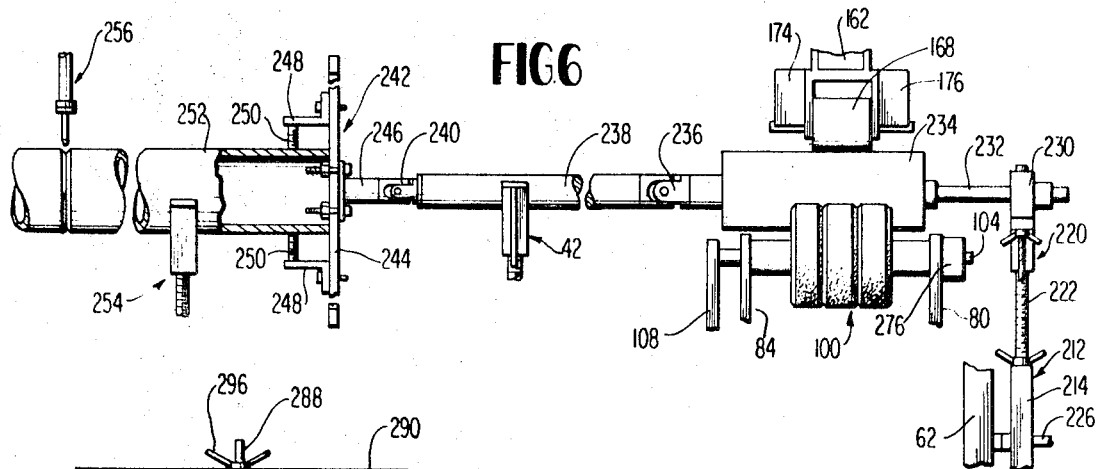
INVENTOR
CHARLES R. HARDEN
BY Newton, Hopkins, & Ormsby
ATTORNEYS March 23, 1971  C. R. HARDEN  3,572,199
PIPE FABRICATOR Filed May 28, 1969   3 Sheets-Sheet 3

INVENTOR
*Charles R. Harden*

BY *Newton, Hopkins, & Ormsby*
ATTORNEYS

United States Patent Office 3,572,199
Patented Mar. 23, 1971

3,572,199
PIPE FABRICATOR
Charles R. Harden, 125 Stevens Creek Road,
Augusta, Ga. 30907
Filed May 28, 1969, Ser. No. 828,505
Int. Cl. B23b 3/04, 3/22
U.S. Cl. 82—101   8 Claims

ABSTRACT OF THE DISCLOSURE

A portable assembly for handling pipe sections to perform various fabricating operations thereon. The main frame includes adjustable support rolls which cradle a pipe section and impart rotation thereto and various attachments may be mounted on the frame for performing cutting and welding operations. A carrier post adjacent the rolls is selectively driven for raising and lowering motions and carries certain of the attachments, while a driven roll is provided with a power take-off to drive another attachment for holding two pipe sections in alignment and rotating them with respect to a welding device.

BACKGROUND OF THE INVENTION

Various operations must be performed on pipe sections at a job site in order to fabricate the requisite lengths, unions and the like for installation. It would therefore be desirable to provide a portable device which is capable of performing the various fabrication operations necsesary and to provide a versatile and efficient assembly for performing cutting, beveling and like operations on pipe sections of various lengths.

BRIEF SUMMARY OF THE INVENTION

The present invention relates to an improved form of pipe fabricating machine which consists essentially of an elongate frame mounting supporting rolls which are movable toward and away from each other to accommodate pipe sections of various diameters and which are effective to impart rotation to the pipe section so supported. The supporting rolls are mounted intermediate the ends of the frame and a vertically movable supporting post is located adjacent to such rolls and a selectively engageable drive is operative to move the post up and down, the upper end of the post carrying either a pressure roll device or pressing the pipe section against the supporting rolls to assure rotation thereby, or a cutting saw attachment. The driven supporting roll is provided with a power take-off and an auxiliary cradle device or slidable frame is mounted between such power take-off device and the corresponding end of the frame and is adapted to be positioned so as to carry one end of a coupling member supported by the rolls and which is provided at its opposite end with a drive extension cooperative with a chuck device adapted to impart rotation to a pipe section beyond the opposite end of the frame. The power take-off device is also operative to drive an assembly mounted on the frame which holds a pair of pipe sections in alignment for welding operations thereon.

The portable device is effective to support, hold and impart drive to pipe sections contained within the frame or beyond the frame so that manual and automatic cutting, welding, beveling and like operations may be performed on the pipe sections.

BRIEF DESCRIPTION OF THE DRAWING FIGURES

FIG. 1 is a perspective view showing the machine according to the present invention and illustrating a pipe section operatively associated therewith;

FIG. 2 is a partial side elevation of the machine shown in FIG. 1 illustrating some of the drive components;

FIG. 5 is a view showing details of the cutting saw attachment;

FIG. 6 is a schematic view illustrating the drive coupling mechanism for imparting rotation to a pipe section beyond the frame of the machine; and FIG. 7 is an elevational view showing the attachment for holding pipe section in abutting relationship and the welding device associated therewith.

DETAILED DESCRIPTION OF THE INVENTION

Figure 4:
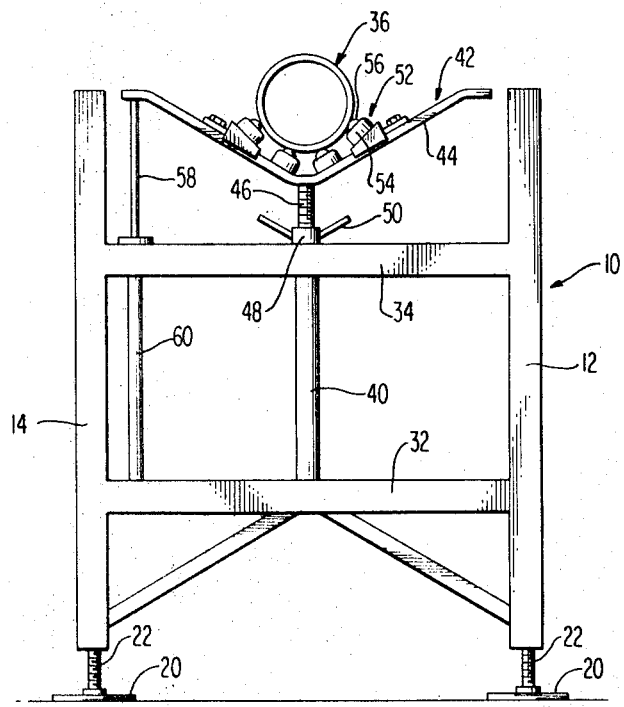
FIG. 4 is an end view of the machine illustrating details of one of the cradle assemblies.

With reference now more particularly to FIG. 1, reference numeral 10 therein indicates the frame of the machine in general and which will be seen to include the corner uprights 12, 14, 16 and 18, each provided with an adjustable foot member 20 which is in the form of a pad adapted to engage the supporting surface and provided centrally thereof with a screw thread member 22 engaging a nut, not shown, fixed in the lower end of the corresponding upright 12, 14, 16 or 18 and by means of which rotation of the pad 20 may impart vertical adjustment thereto so that the frame 10 may be leveled at a job site to which it is transported. Longitudinally extending lower side frame members 24 and 26 extend between corresponding uprights 12 and 18 and 14 and 16, substantially as is shown, and upper side longitudinally extending frame members 28 and 30 are also provided as shown. Cross frame members 32 and 34 are provided at each end of the frame with the upper cross frame member 34 in each case being disposed below the level of the frame members 28 and 30 so as to provide clearance for the pipe section which is indicated generally by the reference character 36. Each of the two cross frame members 32 and 34 mount a guide cylinder 40 therebetween as shown at the right hand end in FIG. 1 and a cradle assembly 42 is operatively associated therewith. The cradle assembly 42 comprises the cradle strap 44 to which is affixed a lead screw member 46 engaging a nut 48 having wings or rods 50 attached thereto, for the purpose of rotating the nut so as to feed the screw 46 and the strap carried thereby in vertical directions for adjustment of the cradle assembly 42. The lower end of the screw 46 may be provided with a guide head slidably engaged in the cylinder 40 for stabilizing the cradle 42, as will be understood by those skilled in the art.

As is shown more clearly in FIG. 4, the cradle assemblies 42 may be provided on their strap portions 44 with anti-friction devices indicated generally by the reference character 52 which may take the form of suitable cups 54 receiving ball members 56 and which are adapted, as shown, to engage and rotatably support the pipe section 36. FIG. 4 also illustrates a stabilizing device for each cradle assembly 42 which will be seen to consist of a depending rod 58 secured to one end of the strap 44 and depending therefrom into sliding engagement with a cylinder 60 fixed between the cross frame members 32 and 34.

Figure 3:
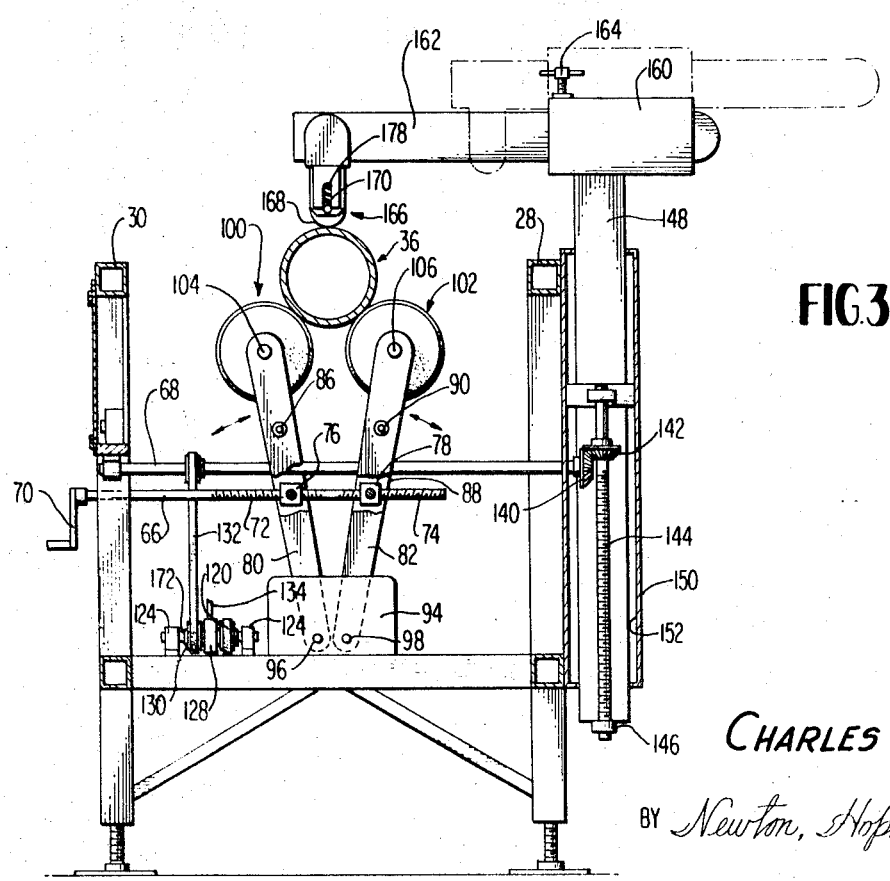
FIG. 3 is an enlarged transverse section taken substantially along the plane of section line 3—3 in FIG. 1 showing details of the support rolls and the drive for the vertical post assembly.

The intermediate portion of the frame 10 is provided with uprights 60 and 62 which mount a plate member 64 at one side of the frame which axially locates the shaft 66, such shaft being provided with a hand crank 70 as may be seen in FIG. 1. The shaft 66 is provided, as may be seen in FIG. 3, with oppositely threaded portions 72 and 74 engaged within the respective nut members 76 and 78 rotatably attached to the arms 80 and 82. The arms 80 and 82 form one of a pair of arms, the arm 80 being paired with the arm 84 and rigidly attached thereto as by a cross brace 86, and the arm 82 being paired with an arm 88 and rigidly attached thereto as by a cross brace 90, see particularly FIGS. 2 and 3. The lower ends of the arms 80 and 82 are disposed between a pair of upright plates 92 and 94 as is shown in FIG. 2 and are pivotally connected thereto as by the pins 96 and 98 as shown in FIG. 3 so that, as will be obvious, rotation of the shaft 66 by means of the hand crank 70 will swing the pairs of arms towards and away from each other as indicated by the arrows in FIG. 3. The arms 84 and 88 are similarly mounted.

The upper ends of the arms support the supporting rolls indicated generally by the reference characters 100 and 102, each pair of arms carrying a shaft 104 or 106 which extend beyond the opposite ends of the corresponding supporting roll. The shaft 106 is merely rotatably supported between the pair of arms 82 and 88 whereas the other shaft 104 supported between the pair of arms 80 and 84 is provided with a pulley or sprocket over which a corresponding drive member 108 is trained, as is shown in FIG. 2, such drive element extending to and over a corresponding pulley or sprocket fixed to the shaft 110 projecting from a gear reduction unit 112. The gear reduction unit 112 is mounted on the frame of the machine and has a drive input shaft 114 thereto, which is directly coupled, through the chain or belt 116 to a suitable electric motor indicated generally by the reference character 118 also mounted on the frame of the machine. The shaft 114 carries a second driving member which imparts drive through the chain or belt 120 to an idler shaft 122 journalled by suitable pillow blocks or the like 124 directly on the frame. The shaft 122, as may be seen in FIG. 3, is provided with a clutch 128 which selectively couples the drive pulley or sprocket 130 to the shaft 122 so as to impart drive, through the belt or chain 132 to the drive shaft 68 previously described. The clutch 128 is actuated through the medium of a clutch actuating rod 134 having a crank end portion 136 projecting at one side of the machine as may be seen in FIG. 1.

The shaft 68 is provided with a bevel gear 140 at one end as is shown in FIG. 3 mating with a bevel gear 142 on the screw shaft 144. The lower end of the screw shaft 144 engages with a nut member 146 which projects laterally therefrom as may be seen in FIG. 2 into connection with a support post member 148 which is slidably guided for vertical motion within the guide tube 150. One side of the guide tube is provided with a slot 152 to accommodate the nut 146 and when the clutch 128 is selectively engaged, dependent upon the direction of rotation of the drive imparted, the post 148 will be moved vertically in corresponding fashion.

Mounted at the upper end of the post 148 is a removable head 160 provided with a transverse bore slidably receiving a shaft 162, the set screw 164 being provided for the purpose of adjusting the position of the shaft 162 with respect to the head 160. The inner free end of the shaft carries a pressure roller assembly 166 which consists of the pressure roll 168 proper having a cross shaft 170 guidably received in the slots 172 of the depending support legs 174 and 176, see particularly FIG. 1. The members 174 and 176 carry springs such as that indicated by the reference character 178 in FIG. 3 normally pressing the pressure roller 168 downwardly. The guide post 148 is laterally aligned with the supporting rolls 100 and 102 and by adjusting the shaft 168 and raising and lowering the post 148 to its proper position, the pressure roller 168 engages the pipe section 36 as shown in FIG. 3 to assure that same is pressed into engagement with the supporting rolls 100 and 102, as will be evident.

FIG. 5 illustrates an alternative attachment mounted at the upper end of the post 148. Such attachment takes the form of a head indicated generally by the reference character 180 removably attached at the upper end of the post 148 and which carries a cross shaft 182 by means of which the arm 184 is pivotally mounted intermediate its ends. One end of the arm 184 carries a shaft 186 to which a circular saw or cutting wheel 188 is secured and outboard of the arm 184, the shaft 186 carries a sprocket or pulley 190 over which a corresponding belt or chain 192 is trained, extending therefrom to the drive member 194 on the output shaft 196 of an electric motor 193 mounted, as shown, on the opposite end of the arm 184. A suitable spring or like resilient member 200 is provided normally to swing the cutting member 188 in an upward direction. A manually operable handle 202 is provided so that the operator may swing the cutting member 188 into engagement with the workpiece 36 supported on the rolls 100 and 102, as shown.

While the pipe section 36 is being rotated by the supporting rolls 100 and 102, the operator may effect a cut at a desired point along the pipe section 36. The cut is started by engaging the cutting member 188 with the pipe section 36 while the latter is stationary and as soon as the cut has been completed through the thickness of the pipe section wall, the pipe section is then rotated to complete the cut therearound. Control of the drive motor 118 for the supporting roll 100 may be effected by a foot control mechanism indicated generally by the reference character 210 as indicated in FIG. 1.

As may be seen in FIG. 1, an auxiliary frame 212 is mounted within the frame 10 for sliding movement longitudinally with respect thereto toward and away from the driven supporting roll 100. The auxiliary frame 212 is of generally U-shaped configuration having the upright portions 214 and 216 and the cross member 218, the latter of which mounts a cradle assembly indicated generally by the reference character 220. The cradle assembly 220 includes the screw thread member 222 and associated nut 224 and depending stabilizing rod 226 in fashion similar to the previously described cradle assemblies 42. The uprights 214 slidably receive longitudinally extending rods 226 and 228 which are rigidly affixed to the frame 10 and suitable clamping means are provided between the auxiliary frame 212 and the main frame 10 to lock the auxiliary frame 212 in a desired longitudinally adjusted position with respect to the main frame 10. The auxiliary frame and its cradle 220 are adapted to handle shorter sections of pipe than can be accommodated by the adjacent end cradle 42 and as is shown in FIG. 6, the assembly 212 also serves a further function and purpose.

As illustrated in FIG. 6, when the assembly 212 is adjusted in close proximity to the frame uprights 62 it may be locked in such position and a pillow block 230 mounted on the strap of the cradle 220 journals one end of a shaft 232 provided with an enlarged drive portion 234 supported on the rolls 100 and 102 and held in engagement therewith by means of the bearing roller 168, substantially as is shown. The assembly 212, then, forms an outboard support for the drive member 234 which is provided, on its opposite side, with a universal joint 236 by means of which it is coupled to an intermediate drive shaft 238 which may be supported by the end cradle assembly 42 as shown and which is provided at its free end with a further universal joint 240 by means of which it is coupled to the chuck assembly 242. The chuck assembly 242 comprises a plate 244 to which the stub shaft 246 is removably attached and which carries a plurality of L-shaped arm members 248 which, cooperatively with the threaded members 250 carried thereby, form the jaws of a chuck by means of which the corresponding end of a pipe section 252 is clamped and secured for rotation with the chuck assembly 242. An outboard cradle assembly indicated generally by the reference character 254 and which may be seen in its entirety in FIG. 2 supports a remote end portion of the workpiece 252. The purpose of this attachment is to permit a pipe section beyond the end of the frame to be coupled to its drive and rotated whereby a welding operation, cutting or beveling operation may be performed, as for example by the manual or automatic torch or welding assembly indicated generally by the reference character 256.

One or more of the stands 254 may be provided and, as is shown in FIG. 2, may include a stand portion 258 having an upright post or tube 260 provided with a set screw 262 by means of which the post 264 is vertically adjustable, the post carrying a tube 266 adjacent its upper end secured adjustably thereto by means of its set screw 268 and the cradle assembly proper is carried by the member 266, the cradle including, as has been described before, the manually operable height adjusting nut 270 and a cradle strap 272 carried thereby.

As may be seen in FIGS. 1, 2 and 7, the support roll 100 which is the driven support roll is provided, on the end of its shaft 104 opposite the drive connection at 108, with a bevel gear 274, the bevel gear being provided with a safety cap 276 if desired, as is shown in FIG. 7.

The gear 274 presents a power take-off device by means of which the attachment shown in FIG. 7 may be driven. The attachment as shown in FIG. 7 may take the form of an auxiliary frame member 280 removably secured at its opposite ends to the frame side members 28 and 30, substantially as is shown and which mounts a shaft 282 provided with a bevel gear 284 which may be brought into meshing engagement with the power take-off gear 274. The shaft 282 carries a circular plate 286 for rotation therewith and the shaft continues in the extension portion 288 thereof for reception of a further plate 290. Thus, by sandwiching the two pipe sections 292 and 294 between the plates 286 and 290, as shown, and clamping down upon same by means of the wing nut 296, the pipe sections 292 and 294 are held captive between the plates and in abutting alignment with each other with their beveled ends in proximity as shown.

A brake comprising a pivoted carrier member 298 provided with a brake pad 300 engaging with the periphery of the plate 286 is pivotally mounted on the frame element 280 and is resiliently urged, under the action of the spring 302, constantly to bear against the periphery of the plate 286 and prevent uneven motion being imparted to the plates 286 and 290. An electrical ground indicated generally by the reference character 304 is mounted on the frame member 280 by means of a resilient element 306 constantly to bear against the underside of the plate 286 and is provided with a roller 308 to assure continuous contact therewith. The lower end of the rod carrying the roller 308 is provided with a clamp portion 310 which may be connected to a suitable electrical welding ground, as will be understood by those skilled in the art. To counterbalance the effect of the ground 304, a pressure foot indicated generally by the reference character 312 bearing diametrically with respect to the ground may be provided, substantially as is shown.

The welding attachment is indicated generally by the reference character 314 and will be seen to consist of a tube 316 removably clamped as by the mechanism 318 to the frame member 28 and which tube is provided with a set screw 320 by means of which the rod 322 may be adjustably mounted to position the welding head 324 at the proper position with respect to the abutting workpieces 292 and 294. The upper end of the rod 322 carries a sleeve 330 and associated set screw 332 by means of which it is adjustably coupled to the rod 334 which carries a further sleeve 336 resiliently receiving the follower rod element 338, as will be appreciated. The rod 338 carries the welding head 324, as shown, and assures the welding head 324 will follow in proper proximity to the workpieces 292 and 294 as they are rotated.

What I claimed is:

1. A machine for manipulating pipe sections to perform various fabricating operations thereon, comprising in combination, a portable main frame adapted to be set up at job site, said frame being elongate to handle pipe sections of various lengths, a pair of supporting rolls adapted to cradle a pipe section therebetween, a pair of upstanding arms for each roll pivoted at their lower ends to said frame and journalling their respective roll adjacent their upper ends, the arms of each pair being spaced longitudinally of the frame intermediate the ends thereof, and means carried by said frame for swinging the two pairs of arms toward and away from each other correspondingly to vary the spacing between said rolls.

a vertical carrier post slidably carried by said frame in lateral registry to said rolls, a drive member carried by said frame for raising and lowering said carrier post, drive means carried by said frame including a first power path connected to one of said rolls for rotating same and a second power path including a selectively engageable clutch for driving said drive member, and means mounted on said carrier post for engaging a pipe section supported therebelow by said rolls.

2. The machine as defined in claim 1 including an auxiliary frame disposed in the space between said rolls and one end of said main frame, means mounting said auxiliary frame on said main frame for selective positioning longitudinally within said space, and a cradle mounted on said auxiliary frame for vertical adjustment relative thereto.

3. The machine as defined in claim 2 including a drive attachment carried at one end by said cradle and including a drive cylinder engaging said rolls, an extension shaft connected to said drive cylinder, and a chuck powered by said extension shaft for rotating a pipe section located beyond the other end of said main frame.

4. The machine as defined in claim 3 including a second cradle mounted for vertical adjustment on said other end of said main frame for supporting said extension shaft said extension shaft being universally connected to said drive cylinder and said chuck.

5. The machine as defined in claim 1 wherein said one roll is provided with a power take-off, a turntable assembly removably mounted on said main frame in engagement with said power take-off and including means for holding two pipe sections in abutting alignment and rotating same, and a welding attachment mounted on said main frame for joining two pipe sections so held and rotated.

6. The machine as defined in claim 1 wherein said means comprises a pressure head, said pressure head including a horizontal arm slidably carried by said carrier post at the upper end thereof, a spring-urged roller depending from the free end of said arm to bear resiliently upon a pipe section supported on said rolls.

7. The machine as defined in claim 6 including cradle means at the opposite ends of said main frame, each cradle means being vertically adjustable to aid said rolls in supporting a pipe section, and each including antifriction means for allowing rotation of the pipe section so supported.

8. The machine as defined in claim 1 wherein said means comprises a cutting saw attachment including an arm pivotally attached intermediate its ends to said post, a circular saw journalled on one end of said arm, a motor mounted on the other end of said arm, a drive connection between said motor and said saw, and a handle for swinging the arm to engage the saw with a pipe section supported on said rolls.

References Cited

UNITED STATES PATENTS

| | | | |
|---|---|---|---|
| 2,810,187 | 10/1957 | Klien | 82—101X |
| 2,903,934 | 9/1959 | Montgolf et al. | 82—101 |
| 3,173,318 | 3/1965 | Lindemann | 82—101X |
| 3,257,881 | 6/1966 | Davis | 82—101 |
| 3,406,599 | 10/1968 | Horton | 82—101 |

HARRISON L. HINSON, Primary Examiner

U.S. Cl. X.R.

82—4